United States Patent
Wang et al.

(10) Patent No.: US 11,948,698 B2
(45) Date of Patent: Apr. 2, 2024

(54) EXPERIMENTAL FACILITY AND METHOD FOR STUDYING JET IMPACT CHARACTERISTICS AT CORE OUTLET OF FAST REACTOR

(71) Applicant: Xi'an Jiaotong University, Shaanxi (CN)

(72) Inventors: Mingjun Wang, Shaanxi (CN); Yingjie Wang, Shaanxi (CN); Wenxi Tian, Shaanxi (CN); Guanghui Su, Shaanxi (CN); Suizheng Qiu, Shaanxi (CN)

(73) Assignee: Xi'an Jiaotong University, Shaanxi (CN)

( * ) Notice: Subject to any disclaimer, the term of this patent is extended or adjusted under 35 U.S.C. 154(b) by 53 days.

(21) Appl. No.: 17/646,205

(22) Filed: Dec. 28, 2021

(65) Prior Publication Data
US 2022/0208404 A1    Jun. 30, 2022

(30) Foreign Application Priority Data
Dec. 30, 2020    (CN) .......................... 202011630653.X (51) Int. Cl.
| | | |
|---|---|---|
| G21C 1/02 | (2006.01) | |
| G21C 1/03 | (2006.01) | |
| G21C 17/00 | (2006.01) | |
| G21C 17/022 | (2006.01) | |

(52) U.S. Cl.
CPC ............. *G21C 17/022* (2013.01); *G21C 1/03* (2013.01); *G21C 17/001* (2013.01)

(58) Field of Classification Search
None
See application file for complete search history.

(56) References Cited

U.S. PATENT DOCUMENTS

| | | | |
|---|---|---|---|
| 2022/0205630 A1* | 6/2022 | Tian | ...................... F22B 37/426 |
| 2022/0375636 A1* | 11/2022 | Zhang | ...................... F01K 7/32 |

FOREIGN PATENT DOCUMENTS

| | | | | |
|---|---|---|---|---|
| CN | 104931286 A | * | 9/2015 | |
| CN | 209841338 U | * | 12/2019 | |
| CN | 107145175 B | * | 11/2020 | ............. G05D 23/30 |
| CN | 112614602 A | * | 4/2021 | ........... G21C 17/001 |
| WO | WO-2014063443 A1 | * | 5/2014 | ............. F01K 25/00 |

* cited by examiner

*Primary Examiner* — Lily C Garner
(74) *Attorney, Agent, or Firm* — McDonnell Boehnen Hulbert & Berghoff LLP (57) ABSTRACT

An experimental system a method for studying jet impact characteristics at a core outlet of a fast reactor are provided. The system includes a jet impact main loop including a water storage tank, plunger pumps, a filter, preheaters, a jet impact chamber, a heat regenerator, a condenser, valves, flow meters and pipelines connecting these facilities; a cooling loop including cooling tower, a cooling pump, a regulating valve and a flow meter; and a makeup water loop including a deionized water machine, a makeup water tank and a plunger pump. Water in the water storage tank flows to the heat regenerator via the plunger pump, is preliminarily heated by the heat regenerator and then is divided into three branches to flow to the jet impact container.

6 Claims, 4 Drawing Sheets

EXPERIMENTAL FACILITY AND METHOD FOR STUDYING JET IMPACT CHARACTERISTICS AT CORE OUTLET OF FAST REACTOR

CROSS REFERENCE TO RELATED APPLICATION

This patent application claims the benefit and priority of Chinese Patent Application No. 202011630653.X, entitled "EXPERIMENTAL FACILITY AND METHOD FOR STUDYING JET IMPACT CHARACTERISTICS AT CORE OUTLET OF FAST REACTOR" filed with the Chinese Patent Office on Dec. 30, 2020, the disclosure of which is incorporated by reference herein in its entirety as part of the present application.

TECHNICAL FIELD

The present disclosure belongs to the technical field of cores of fast reactors, and specifically relates to an experimental facility and a method for studying jet impact characteristics at a core outlet of a fast reactor.

BACKGROUND ART

A fast reactor adopts liquid metal as a coolant, and has higher economical efficiency and inherent safety. Most of core assemblies of fast reactors are of box type design and are in typically closed fuel assembly design forms. The temperatures of coolants flowing out of different assemblies (such as a fuel assembly, a control rod assembly and a breeding blanket assembly) are different, and a flow state at an outlet area is extremely complex. Cold and hot fluids are mixed with each other at the core outlet of the reactor in a jet manner, insufficient mixing leads to temperature fluctuation of the coolant, and the temperature fluctuation of the coolant is transmitted to a surface close to a solid structure in a heat conduction and heat convection manner. In this way, the surface of the solid structure generates temperature oscillation that is transmitted to an interior of the solid. The structural member near the temperature pulsation is subjected to periodic thermal stress, and thus thermal fatigue damage of the structure may be caused after a long period of time. In addition, due to a high thermal conductivity of the liquid metal, compared with a pressurized water reactor, thermal fatigue and structural integrity damage of components are easily caused. So, structural safety of the reactor is threatened. Therefore, a jet impact process of the coolant with different temperatures at the core outlet area of the fast reactor is an important thermal-hydraulic phenomenon which must be considered in the structure of the fast reactor, and is also the key point of international fast reactor research.

Simplified geometric structures are mostly adopted by domestic and foreign scholars to research the temperature fluctuation condition in the jet impact mixing process, which mainly includes parallel two jets model, parallel triple jets model and a coaxial jet model. For example, the parallel two-jet model is designed by Wakamatsu and the like. In this parallel two model, the hot fluid and the cold fluid are respectively injected into a mixing cavity through two rectangular nozzles; a structural plate is placed at a fixed position in the mixing cavity which is away from the nozzles; and the temperature fluctuation condition of the fluid and a temperature fluctuation attenuation rate of the fluid flowing to the solid surface are obtained by experiments. For another example, parallel triple jets impact experiment is developed by Tokuhiro and the like. In this experiment, the low-temperature fluid passes through a middle nozzle; the hot fluid passes through nozzles on two sides; flow speeds of these three nozzles are different, and a temperature fluctuation condition of the fluid with different temperature differences in the triple jets impact process is obtained through the experiment.

In practice, many experimental researches for fluid jet mixing phenomena at different temperatures exist at domestic and foreign. However, the jet impact process of a simple channel is used as a research object. Structural difference between the jet impact process and a core outlet structure of an actual fast reactor is large, and an impact influence of coolant jet impact on a central measuring column of an upper plenum of the reactor core is not considered. In addition, due to a fact that the liquid metal is poor in light transmittance and extremely high in requirement for an experimental loop, another working medium is adopted to replace the liquid metal to conduct experiments, which is a good choice. Therefore, a corresponding scaling benchmark needs to be designed based on a similarity criterion and a modeling theory for core outlet structure of an actual fast reactor.

SUMMARY

The present disclosure provides an experimental system a method for studying the jet impact characteristics at a core outlet of a fast reactor, aiming at solving the problem that an experimental facility cannot meet the research requirement on jet impact at the outlet of the reactor core in the field of nuclear engineering. Scholars have obtained similar standards of replacing a liquid metal with water or air by experiments, so that the experimental system in the present disclosure replaces the liquid metal with deionized water to carry out a jet impact experiment. The system in the present disclosure can enable the jet impact experiment under a large-range temperature difference working condition. Meanwhile, this system can flexibly regulate flows of three branches, improve heat utilization rate of the system, and accurately obtain a large number of experiment parameters such as flow, temperature and velocity. Accordingly, a jet impact phenomenon can be deeply researched.

In order to achieve the above purpose, the present disclosure provides the following technical solutions:

An experimental system for studying jet impact characteristics at a core outlet of a fast reactor includes a jet impact main loop of the experimental system, a cooling loop and a makeup water loop, the jet impact main loop of the experimental system includes a jet impact chamber, a heat regenerator, three branch pipelines for connecting an inlet of the jet impact chamber and a tube-side outlet of the heat regenerator, a first pipeline for connecting an outlet of the jet impact chamber and a shell-side inlet of the heat regenerator, a condenser, a second pipeline for connecting a shell-side outlet of the heat regenerator and a shell-side inlet of the condenser, a water storage tank, a water return pipeline for connecting an inlet of the water storage tank and a shell-side outlet of the condenser, a fourth stop valve installed on the water return pipeline and configured for regulating a flow of deionized water returning into the water storage tank, a main pipeline for connecting an outlet of the water storage tank and a tube-side inlet of the heat regenerator, and a filter, a first regulating valve and a first plunger pump which are arranged on the main pipeline, the jet impact chamber is configured to simulate the fast reactor core; the cooling loop includes the condenser, a cooling pump connected to the tube-side inlet of the condenser, a fifth regulating valve, a fourth flow meter connected to a tube-side outlet of the condenser, and a cooling tower; and the makeup water loop includes natural water supply, a deionized water machine, a makeup water tank and a second plunger pump.

A first stop valve, a first flow meter, a first preheater and a first thermometer are sequentially installed on a first branch pipeline of the three branch pipelines which is configured for connecting the tube-side outlet of the heat regenerator and the inlet of the jet impact chamber, the first stop valve is configured for regulating a flow of deionized water in the first branch pipeline, the flow of the deionized water in the first branch pipeline is measured via the first flow meter, the first preheater is configured for heating the deionized water in the first branch pipeline, and a temperature of the deionized water in the first branch pipeline is measured via the first thermometer.

A second stop valve, a second flow meter, a second preheater and a second thermometer sequentially are installed on a second branch pipeline of the three branch pipelines which is configured for connecting the tube-side outlet of the heat regenerator and the inlet of the jet impact chamber, the second stop valve is configured for regulating a flow of deionized water in the second branch pipeline, the flow of the deionized water in the second branch pipeline is measured via the second flow meter, the second preheater is configured for heating the deionized water in the second branch pipeline, and a temperature of the deionized water in the second branch pipeline is measured via the second thermometer.

A third stop valve, a third flow meter, a third preheater and a third thermometer are sequentially installed on a third branch pipeline of the three branch pipelines which is configured for connecting the tube-side outlet of the heat regenerator and the inlet of the jet impact chamber, the third stop valve is configured for regulating a flow of deionized water in the third branch pipeline, the flow of the deionized water in the third branch pipeline is measured via the third flow meter, the third preheater is configured for heating the deionized water in the third branch pipeline, and a temperature of the deionized water in the third branch pipeline is measured via the third thermometer;

On the jet impact main loop, upstream and downstream branches of the heat regenerator are respectively connected with two ends of a second regulating valve via a third pipeline to form a first bypass loop, and the first bypass loop assists in regulating a flow of deionized water in the heat regenerator.

On the jet impact main loop, upstream and downstream branches of the condenser are respectively connected with two ends of a third regulating valve via a fourth pipeline to form a second bypass loop, and the second bypass loop assists in regulating a flow of deionized water in the condenser.

On the jet impact main loop, upstream and downstream branches of the water storage tank are respectively connected with two ends of a fourth regulating valve via a fifth pipeline to form a third bypass loop, and the third bypass loop assists in regulating a flow of deionized water in the jet impact main loop.

A ball valve installed on an upstream pipeline of the water storage tank and configured to be a drain outlet, an experimental working medium is discharged via the ball valve after an experiment is conducted for a period of time.

A signal processor connected with a data measurement system in the jet impact chamber, the signal processor includes a temperature measurement system and a particle image velocimetry system, to collect and process experimental data.

The filter, the first regulating valve and the first plunger pump are sequentially connected from the outlet of the water storage tank to the tube-side inlet of the heat regenerator, and are arranged on the main pipeline; the filter is configured to filter fluid at an inlet of the first plunger pump, the first regulating valve is configured to regulate a flow of the fluid at the inlet of the plunger pump, and the first plunger pump is configured to drive the fluid to flow in the main pipeline.

A wall surface of the jet impact chamber is a cylindrical barrel, a solid cylinder is installed in a center of a top section of the cylindrical barrel; high-temperature strain gauges are installed on portions of the wall surface of the solid cylinder which are at different heights and configured for measuring thermal impact, which is caused by deionized water jet impact at different temperatures, to the wall surface of the solid cylinder; the fluid flows out through an annular flow channel in the top section of the cylindrical barrel and is connected to the shell-side inlet of the heat regenerator through the first pipeline after being collected; a thermocouple arrangement frame is arranged in the jet impact chamber; multiple high-temperature-resistant thermocouples are arranged on portions of the thermocouple arrangement frame which are at different heights and configured for measuring a temperature field in the jet impact chamber; three jet impact nozzles are welded at a bottom portion of the jet impact chamber, are extended into the jet impact chamber to a preset height, and are connected with the tube-side outlet of the heat regenerator via the three branch pipelines; and deionized water with different temperatures and different flows enters the jet impact chamber through the three jet impact nozzles to generate a jet impact mixture.

In some embodiments, the cylindrical barrel of the jet impact chamber may be coated with a heat preservation layer, a diameter of the cylindrical barrel may be 580 mm, and a height of the cylindrical barrel may be 800 mm; and a diameter of the solid cylinder which is installed in the center of the top section of the cylindrical barrel may be 180 mm, and the solid cylinder may be made of stainless steel.

In some embodiments, the thermocouple arrangement frame may have six layers in a height direction of the cylindrical barrel, three layers of the six layers may be located in an area corresponding to the solid cylinder, six of the high-temperature-resistant thermocouples may be uniformly arranged on each of the three layers in a circumferential direction of the cylindrical barrel, remaining three layers of the six layers may be located in an area between the three jet impact nozzles and the solid cylinder, and thirteen of the high-temperature-resistant thermocouples may be uniformly arranged on each of the remaining three layers in the circumferential direction and a radial direction of the cylindrical barrel.

In some embodiments, the high-temperature strain gauges that are arranged on the portions of the wall surface of the solid cylinder may be arranged into two layers in a height direction of the cylindrical barrel, and four of the high-temperature strain gauges may be uniformly arranged on each of the two layers in a circumferential direction of the cylindrical barrel.

In some embodiments, the three jet impact nozzles may be hexagonal sleeves, thicknesses of the hexagonal sleeves may be 4 mm, a side length inside each of the hexagonal sleeves may be 54 mm, the three jet impact nozzles are arranged triangularly, and a distance between centers of any two adjacent nozzles of the three jet impact nozzles may be 62 mm.

An experimental method based on an experimental facility for studying jet impact characteristics at a core outlet of a fast reactor of the present disclosure includes: in an experiment, turning the natural water supply into deionized water after the natural water supply passes through the deionized water machine, then enabling the deionized water to reach the makeup water tank, and enabling the deionized water to enter into the water storage tank via the second plunger pump; enabling the deionized water to flow out of the water storage tank and divide into two paths, one of which returns to the water storage tank via the fifth pipeline where the fourth regulating valve is located, such that flow and pressure are regulated; enabling the deionized water to mostly enter into the jet impact main loop, pass through the filter, the first regulating valve and the first plunger pump sequentially, and reach the tube-side inlet of the heat regenerator; enabling the deionized water in the heat regenerator to absorb heat of high-temperature deionized water flowing out of the jet impact chamber, and increasing a temperature of the deionized water preliminarily; dividing the deionized water of which the temperature is preliminarily increased into three parallel branches to be led to the bottom portion of the jet impact chamber; on the three parallel branches, regulating the flow of the deionized water of the three parallel branches through the first stop valve, the second stop valve and the third stop valve respectively; enabling the deionized water to enter the first preheater, the second preheater and the third preheater after passing through the first flow meter, the second flow meter and the third flow meter respectively; heating the deionized water to different temperatures by regulating electric power of respective heating rods of the first preheater, the second preheater and the third preheater; measuring specific temperature values by the first thermometer, the second thermometer and the third thermometer respectively; enabling the deionized water with different temperatures and flows to enter the jet impact chamber through the three jet impact nozzles; intensely mixing the deionized water with different temperatures and flows in the jet impact chamber; and enabling the deionized water after being mixed to flow upwards to impact the solid cylinder; cooling the deionized water flowing out of the jet impact chamber after the deionized water flows through the heat regenerator and the condenser, and enabling the deionized water to finally return to the water storage tank to form a closed circulation; connecting the second regulating valve to two ends of the heat regenerator in parallel via the third pipeline to form the first bypass loop, and connecting the third regulating valve to two ends of the condenser in parallel via the fourth pipeline to form the second bypass loop; and enabling the deionized water in the jet impact main loop to minorly pass through the first bypass loop and the second bypass loop, such that the flow of the deionized water in both of the heat regenerator and the condenser is regulated.

In some embodiments, sending water in the cooling loop to the tube-side inlet of the condenser via the cooling pump and the fifth regulating valve, enabling heat exchange to be conducted between the water and the high-temperature deionized water in the jet impact main loop in the condenser; and enabling the water to flow through the fourth flow meter after the water is heated, and finally to reach the cooling tower to be cooled.

Compared with the prior art, the embodiments have the following advantages:

Firstly, the three jet impact nozzles in the jet impact chamber are designed with reference to the actual structure of a fast reactor core assembly, and the three nozzles are extended in the jet impact chamber to a certain height, so that the jet impact process of the experimental working medium is not affected by the bottom structure of the jet impact chamber.

Secondly, the stop valves and the preheaters are respectively arranged on each of the three branch pipelines, so that the flow and the temperature of each of the three branch pipelines can be flexibly controlled, and the experiment is conducted under the working conditions of large-range inlet temperature difference and inlet flow.

Thirdly, the heat utilization rate of the system is improved via the arrangement of the heat regenerator.

Fourthly, temperature measuring points in the jet impact chamber are arranged on the thermocouple arrangement frame, the measuring point arrangement is more flexible, and experimental facilities such as a simulation control rod guide pipe can be installed on the thermocouple arrangement frame in the later period.

Fifthly, the experimental system adopts a particle image velocimetry technology, flow data in the jet impact chamber can be accurately measured, and the precision and the visualization degree are higher.

List of reference characters: 1 jet impact chamber; 2 signal processor; 3 heat regenerator; 4 condenser; 5 water storage tank; 6 filter; 7 first regulating valve; 8 first plunger pump; 9 first stop valve; 10 second stop valve; 11 third stop valve; 12 first flow meter; 13 second flow meter; 14 third flow meter; 15 first preheater; 16 second preheater; 17 third preheater; 18 first thermometer; 19 second thermometer; 20 third thermometer; 21 second regulating valve; 22 third regulating valve; 23 fourth stop valve; 24 fourth regulating valve; 25 ball valve; 201 cooling pump; 202 fifth regulating valve; 203 fourth flow meter; 204 cooling tower; 301 deionized water machine; 302 makeup water tank; 303 second plunger pump; 101 solid cylinder; 102 high-temperature strain gauge; 103 thermocouple arrangement frame; 104 high-temperature-resistant thermocouple; 105 cylindrical barrel; and 106 three jet impact nozzles.

DETAILED DESCRIPTION OF THE EMBODIMENTS

The following describes the present disclosure in detail with reference to the attached figures.

Figure 1:
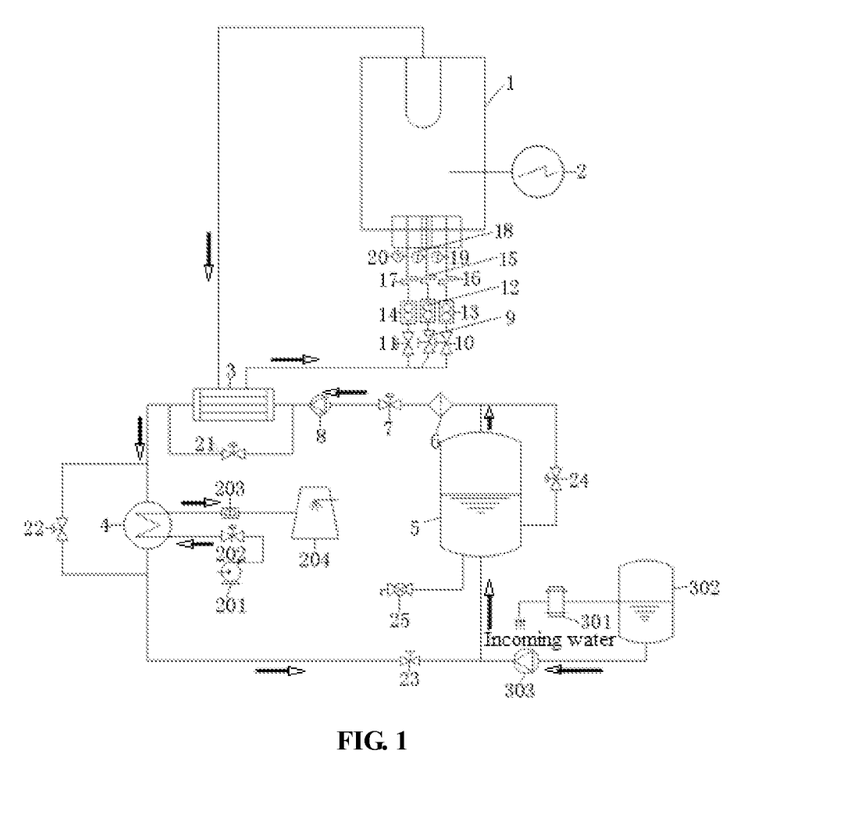
FIG. 1 is a diagram of an experiment system.

As shown in FIG. 1, an experimental system for studying jet impact characteristics at a core outlet of a fast reactor, the experimental system includes a jet impact main loop of the experimental system, a cooling loop and a makeup water loop. The jet impact main loop of the experimental system includes a jet impact chamber 1, a heat regenerator 3, three branch pipelines for connecting an inlet of the jet impact chamber 1 and a tube-side outlet of the heat regenerator 3, a first pipeline for connecting an outlet of the jet impact chamber 1 and a shell-side inlet of the heat regenerator 3, a condenser 4, a second pipeline for connecting a shell-side outlet of the heat regenerator 3 and a shell-side inlet of the condenser 4, a water storage tank 5, a water return pipeline for connecting an inlet of the water storage tank 5 and a shell-side outlet of the condenser 4, a fourth stop valve 23 installed on the water return pipeline and configured for regulating a flow of deionized water returning into the water storage tank 5, a main pipeline for connecting an outlet of the water storage tank 5 and a tube-side inlet of the heat regenerator 3, and a filter 6, a first regulating valve 7 and a first plunger pump 8 which are arranged on the main pipeline, the jet impact chamber 1 is configured to simulate the fast reactor core. The cooling loop includes the condenser 4, a cooling pump 201 connected to the tube-side inlet of the condenser 4, a fifth regulating valve 202, a fourth flow meter 203 connected to a tube-side outlet of the condenser 4, and a cooling tower 204. And the makeup water loop includes natural water supply, a deionized water machine 301, a makeup water tank 302 and a second plunger pump 303.

A first stop valve 9, a first flow meter 12, a first preheater 15 and a first thermometer 18 sequentially installed on a first branch pipeline of the three branch pipelines which is configured for connecting the tube-side outlet of the heat regenerator 3 and the inlet of the jet impact chamber 1. The first stop valve 9 is configured for regulating a flow of deionized water in the first branch pipeline, the flow of the deionized water in the first branch pipeline is measured via the first flow meter 12, the first preheater 15 is configured for heating the deionized water in the first branch pipeline, and a temperature of the deionized water in the first branch pipeline is measured via the first thermometer 18.

A second stop valve 10, a second flow meter 13, a second preheater 16 and a second thermometer 19 sequentially installed on a second branch pipeline of the three branch pipelines which is configured for connecting the tube-side outlet of the heat regenerator 3 and the inlet of the jet impact chamber 1. The second stop valve 10 is configured for regulating a flow of deionized water in the second branch pipeline, the flow of the deionized water in the second branch pipeline is measured via the second flow meter 13, the second preheater 16 is configured for heating the deionized water in the second branch pipeline, and a temperature of the deionized water in the second branch pipeline is measured via the second thermometer 19.

A third stop valve 11, a third flow meter 14, a third preheater 17 and a third thermometer 20 sequentially installed on a third branch pipeline of the three branch pipelines which is configured for connecting the tube-side outlet of the heat regenerator 3 and the inlet of the jet impact chamber 1. The third stop valve 11 is configured for regulating a flow of deionized water in the third branch pipeline, the flow of the deionized water in the third branch pipeline is measured via the third flow meter 13, the third preheater 17 is configured for heating the deionized water in the third branch pipeline, and a temperature of the deionized water in the third branch pipeline is measured via the third thermometer 20.

On the jet impact main loop, upstream and downstream branches of the heat regenerator 3 are respectively connected with two ends of a second regulating valve 21 via a third pipeline to form a first bypass loop, and the first bypass loop assists in regulating a flow of deionized water in the heat regenerator 3.

On the jet impact main loop, upstream and downstream branches of the condenser 4 are respectively connected with two ends of a third regulating valve 22 via a fourth pipeline to form a second bypass loop, and the second bypass loop assists in regulating a flow of deionized water in the condenser 4.

On the jet impact main loop, upstream and downstream branches of the water storage tank 5 are respectively connected with two ends of a fourth regulating valve 24 via a fifth pipeline to form a third bypass loop, and the third bypass loop assists in regulating a flow of deionized water in the jet impact main loop.

A ball valve 25 installed on an upstream pipeline of the water storage tank 5 and configured to be a drain outlet. An experimental working medium is discharged via the ball valve 25 after an experiment is conducted for a period of time.

A signal processor 2 connected with a data measurement system in the jet impact chamber 1. The signal processor includes a temperature measurement system and a particle image velocimetry system, to collect and process experimental data.

The filter 6, the first regulating valve 7 and the first plunger pump 8 are sequentially connected from the outlet of the water storage tank 5 to the tube-side inlet of the heat regenerator 3, and are arranged on the main pipeline; the filter 6 is configured to filter fluid at an inlet of the first plunger pump 8, the first regulating valve 7 is configured to regulate a flow of the fluid at the inlet of the plunger pump 8, and the first plunger pump 8 is configured to drive the fluid to flow in the main pipeline.

Figure 2:
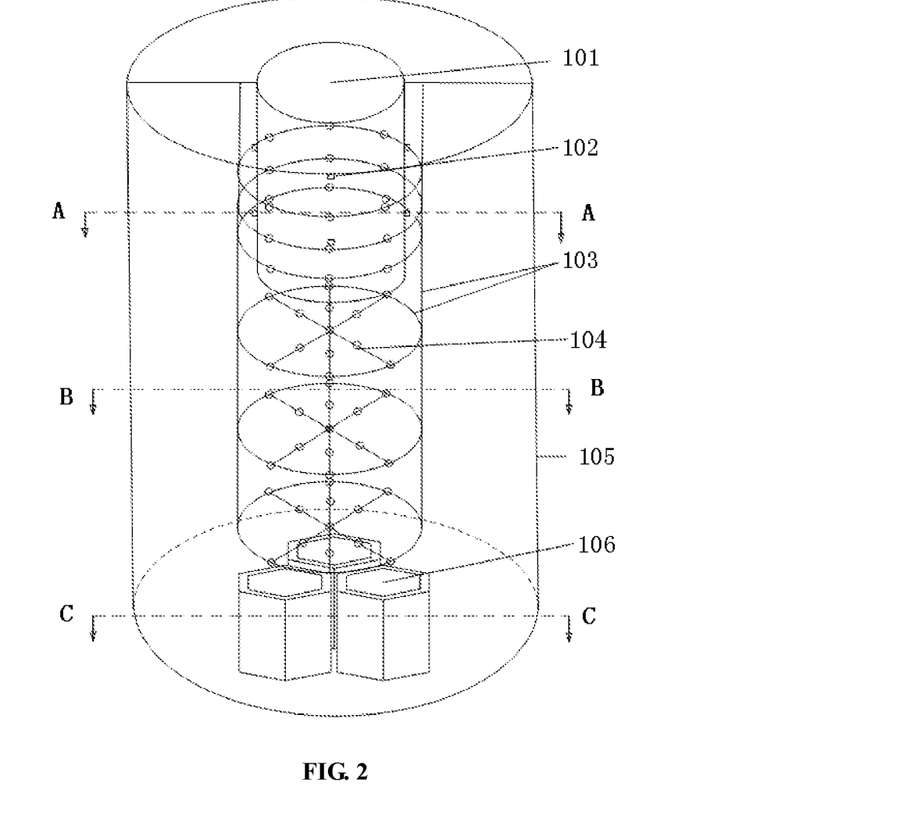
FIG. 2 is a front view shows a structure of a jet impact chamber and measuring points arrangement therein.

As shown in FIG. 2, the cylindrical barrel 105 of the jet impact chamber 1 is coated with a heat preservation layer, a diameter of the cylindrical barrel 105 is 580 mm, and a height of the cylindrical barrel 105 is 800 mm. And a diameter of the solid cylinder 101 which is installed in the center of the top section of the cylindrical barrel 105 is 180 mm, and the solid cylinder 101 is made of stainless steel. high-temperature strain gauges 102 are installed on portions of the wall surface of the solid cylinder which are at different heights and configured for measuring thermal impact, which is caused by deionized water jet impact at different temperatures, to the wall surface of the solid cylinder. The fluid flows out through an annular flow channel in the top section of the cylindrical barrel 105 and is connected to the shell-side inlet of the heat regenerator 3 through the first pipeline after being collected. A thermocouple arrangement frame 103 is arranged in the jet impact chamber 1. Multiple high-temperature-resistant thermocouples 104 are arranged on portions of the thermocouple arrangement frame 103 which are at different heights and configured for measuring a temperature field in the jet impact chamber 1; three jet impact nozzles 106 are welded at a bottom portion of the jet impact chamber 1, are extended into the jet impact chamber 1 to a preset height, and are connected with the tube-side outlet of the heat regenerator 3 via the three branch pipelines. And deionized water with different temperatures and different flows enters the jet impact chamber 1 through the three jet impact nozzles 106 to generate a jet impact mixture.

Figure 4:
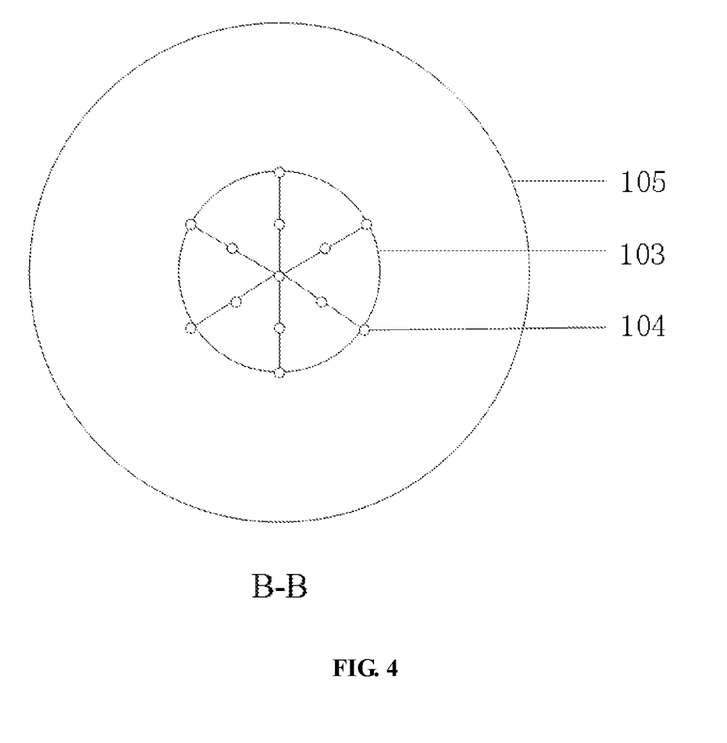
FIG. 4 is a top cross section view taken along line B-B of FIG. 2.

As a preferred embodiment of the present disclosure, the thermocouple arrangement frame 103 has six layers in a height direction of the cylindrical barrel, three layers of the six layers are located in an area corresponding to the solid cylinder 101, six of the high-temperature-resistant thermocouples 104 are uniformly arranged on each of the three layers in a circumferential direction of the cylindrical barrel, remaining three layers of the six layers are located in an area between the three jet impact nozzles 106 and the solid cylinder 101, and thirteen of the high-temperature-resistant thermocouples 104 are uniformly arranged on each of the remaining three layers in the circumferential direction and a radial direction of the cylindrical barrel, as shown in FIG. 4.

Figure 3:
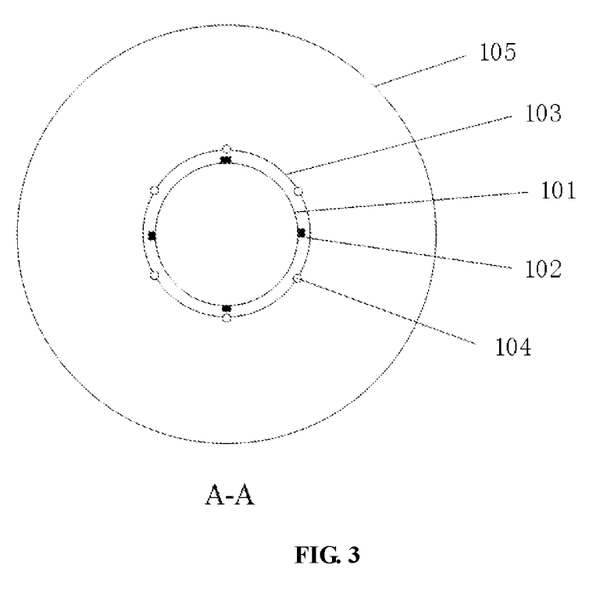
FIG. 3 is a top cross section view taken along line A-A of FIG. 2.

As shown in FIG. 2, the high-temperature strain gauges 102 that are arranged on the portions of the wall surface of the solid cylinder 101 are arranged into two layers in a height direction of the cylindrical barrel, and four of the high-temperature strain gauges 102 are uniformly arranged on each of the two layers in a circumferential direction of the cylindrical barrel, as shown in FIG. 3.

Figure 5:
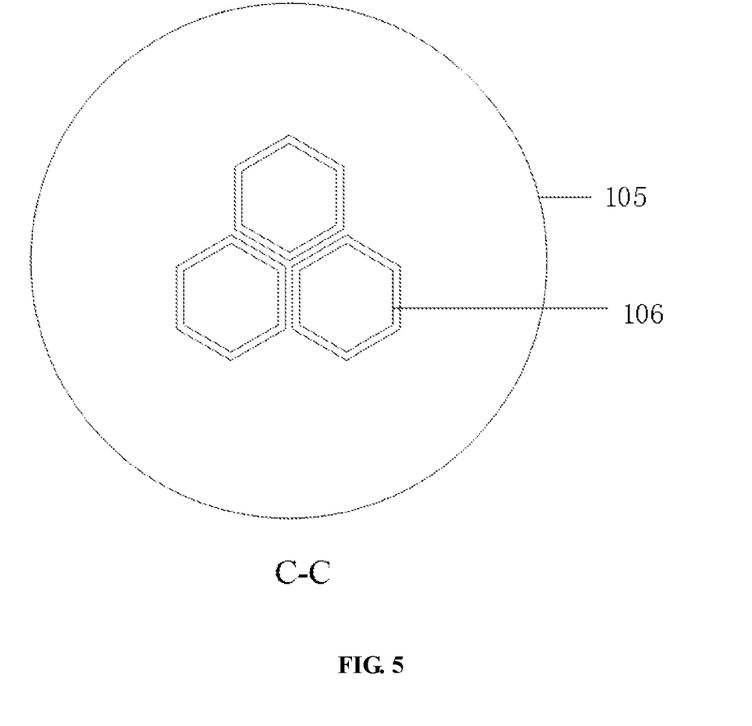
FIG. 5 is a top cross section view taken along line C-C of FIG. 2.

As shown in FIG. 5, the three jet impact nozzles 106 are hexagonal sleeves, thicknesses of the hexagonal sleeves are 4 mm, a side length inside each of the hexagonal sleeves is 54 mm, the three jet impact nozzles are arranged triangularly, and a distance between centers of any two adjacent nozzles of the three jet impact nozzles is 62 mm.

As shown in FIG. 1, an experimental method of an experimental facility for studying jet impact characteristics at a core outlet of a fast reactor includes: in an experiment, the natural water supply is turned into deionized water after the natural water supply passes through the deionized water machine 301, then the deionized water reaches the makeup water tank 302, and the deionized water enters into the water storage tank 5 via the second plunger pump 303. The deionized water flows out of the water storage tank 5 and divides into two paths, one of which returns to the water storage tank 5 via the fifth pipeline where the fourth regulating valve 24 is located, such that flow and pressure are regulated. The deionized water mostly enters into the jet impact main loop, passes through the filter 6, the first regulating valve 7 and the first plunger pump 8 sequentially, and reaches the tube-side inlet of the heat regenerator 3. The deionized water in the heat regenerator 3 absorbs heat of high-temperature deionized water flowing out of the jet impact chamber 1, and a temperature of the deionized water is increased preliminarily. The deionized water of which the temperature is preliminarily increased is divided into three parallel branches to be led to the bottom portion of the jet impact chamber 1. On the three parallel branches, the flow of the deionized water of the three parallel branches is regulated through the first stop valve 9, the second stop valve 10 and the third stop valve 11 respectively. The deionized water enters the first preheater 15, the second preheater 16 and the third preheater 17 after passing through the first flow meter 12, the second flow meter 13 and the third flow meter 14 respectively. The deionized water is heated to different temperatures by regulating electric power of respective heating rods of the first preheater, the second preheater and the third preheater. Specific temperature values is measured by the first thermometer 18, the second thermometer 19 and the third thermometer 20 respectively. The deionized water with different temperatures and flows enters the jet impact chamber 1 through the three jet impact nozzles 106. The deionized water with different temperatures and flows is intensely mixed in the jet impact chamber 1. And the deionized water after being mixed flows upwards to impact the solid cylinder 101. The deionized water flowing out of the jet impact chamber 1 is cooled after the deionized water flows through the heat regenerator 3 and the condenser 4, and the deionized water finally returns to the water storage tank 5 to form a closed circulation. The second regulating valve 21 is connected to two ends of the heat regenerator 3 in parallel via the third pipeline to form the first bypass loop, and the third regulating valve 22 is connected to two ends of the condenser 4 in parallel via the fourth pipeline to form the second bypass loop. And the deionized water in the jet impact main loop minorly passes through the first bypass loop and the second bypass loop, such that the flow of the deionized water in both of the heat regenerator 3 and the condenser 4 is regulated.

Water in the cooling loop is sent to the tube-side inlet of the condenser 4 via the cooling pump 201 and the fifth regulating valve 202. Heat exchange is conducted between the water and the high-temperature deionized water in the jet impact main loop in the condenser 4. And the water flows through the fourth flow meter 203 after the water is heated, and finally reaches the cooling tower 204 to be cooled.

The foregoing is merely illustrative of the present disclosure, and it is not to be construed that the specific embodiments of the present disclosure are limited thereto, and changes and modifications to the embodiments described above should be considered within the scope of the claims of the present disclosure for those skilled in the art to be within the true spirit of the present disclosure.

What is claimed is:

1. An experimental system for studying jet impact characteristics at an outlet of a fast reactor core, the experimental system comprising:
a jet impact main loop of the experimental system, a cooling loop and a makeup water loop,
wherein the jet impact main loop of the experimental system comprises: a jet impact chamber, a heat regenerator, a condenser, a water storage tank, a filter, a first regulating valve, a first plunger pump, three branch pipelines for connecting an inlet of the jet impact chamber with a tube-side outlet of the heat regenerator, a first pipeline for connecting an outlet of the jet impact chamber with a shell-side inlet of the heat regenerator, a second pipeline for connecting a shell-side outlet of the heat regenerator with a shell-side inlet of the condenser, a water return pipeline for connecting an inlet of the water storage tank with a shell-side outlet of the condenser, a fourth stop valve installed on the water return pipeline and configured for regulating a flow of deionized water returning into the water storage tank, a main pipeline for connecting an outlet of the water storage tank with a tube-side inlet of the heat regenerator, the filter, the first regulating valve and the first plunger pump are arranged on the main pipeline, wherein the jet impact chamber is configured to simulate the fast reactor core;
wherein the cooling loop comprises the condenser, a cooling pump connected to the tube-side inlet of the condenser, a fifth regulating valve, a fourth flow meter connected to a tube-side outlet of the condenser, and a cooling tower; and
wherein the makeup water loop comprises a tap water supply, a deionized water machine, a makeup water tank and a second plunger pump;
a first stop valve, a first flow meter, a first preheater and a first thermometer sequentially installed on a first branch pipeline of the three branch pipelines which is configured for connecting the tube-side outlet of the heat regenerator and the inlet of the jet impact chamber, wherein the first stop valve is configured for regulating a flow of deionized water in the first branch pipeline, the first flow meter is configured for measuring the flow of the deionized water in the first branch pipeline, the first preheater is configured for heating the deionized water in the first branch pipeline, and the first thermometer is configured for measuring temperature of the deionized water in the first branch pipeline;

a second stop valve, a second flow meter, a second preheater and a second thermometer sequentially installed on a second branch pipeline of the three branch pipelines which is configured for connecting the tube-side outlet of the heat regenerator and the inlet of the jet impact chamber, wherein the second stop valve is configured for regulating a flow of deionized water in the second branch pipeline, the second flow meter is configured for measuring the flow of the deionized water in the second branch pipeline, the second preheater is configured for heating the deionized water in the second branch pipeline, and the second thermometer is configured for measuring temperature of the deionized water in the second branch pipeline;

a third stop valve, a third flow meter, a third preheater and a third thermometer sequentially installed on a third branch pipeline of the three branch pipelines which is configured for connecting the tube-side outlet of the heat regenerator and the inlet of the jet impact chamber, wherein the third stop valve is configured for regulating a flow of deionized water in the third branch pipeline, the third flow meter is configured for measuring the flow of the deionized water in the third branch pipeline, the third preheater is configured for heating the deionized water in the third branch pipeline, and the third thermometer is configured for measuring temperature of the deionized water in the third branch pipeline;

wherein on the jet impact main loop, upstream and downstream branches of the heat regenerator are respectively connected with two ends of a second regulating valve via a third pipeline to form a first bypass loop, and the first bypass loop is configured to assist in regulating a flow of deionized water in the heat regenerator;

wherein on the jet impact main loop, upstream and downstream branches of the condenser are respectively connected with two ends of a third regulating valve via a fourth pipeline to form a second bypass loop, and the second bypass loop is configured to assist in regulating a flow of deionized water in the condenser;

wherein on the jet impact main loop, upstream and downstream branches of the water storage tank are respectively connected with two ends of a fourth regulating valve via a fifth pipeline to form a third bypass loop, and the third bypass loop is configured to assist in regulating a flow of deionized water in the jet impact main loop;

a ball valve installed on an upstream pipeline of the water storage tank and configured to be a drain outlet, wherein the ball valve is configured for discharging an experimental working medium after an experiment is conducted for a period of time; and a signal processor connected with a data measurement system in the jet impact chamber, wherein the signal processor comprises a temperature measurement system and a particle image velocimetry system configured for collecting and processing experimental data;

wherein the filter, the first regulating valve and the first plunger pump are sequentially connected from the outlet of the water storage tank to the tube-side inlet of the heat regenerator, and are arranged on the main pipeline; the filter is configured to filter fluid at an inlet of the first plunger pump, the first regulating valve is configured to regulate a flow of the fluid at the inlet of the plunger pump, and the first plunger pump is configured to drive the fluid to flow in the main pipeline;

wherein a wall surface of the jet impact chamber is a cylindrical barrel, and the jet impact chamber comprises: a solid cylinder arranged in a center of a top section of the cylindrical barrel; a plurality of high-temperature strain gauges arranged into layers in a height direction of a wall surface of the solid cylinder and are uniformly arranged on each of the layers in a circumferential direction of the wall surface of the solid cylinder, and the plurality of high-temperature strain gauges are configured for measuring thermal impact of deionized water to the wall surface of the solid cylinder; a thermocouple arrangement frame arranged inside the jet impact chamber; a plurality of high-temperature-resistant thermocouples arranged into layers in a height direction of the thermocouple arrangement frame and are uniformly arranged on each of the layers in a circumferential direction and a radial direction of the thermocouple arrangement frame, and the plurality of high-temperature-resistant thermocouples are configured for measuring a temperature field in the jet impact chamber; three jet impact nozzles welded with a bottom portion of the jet impact chamber, extended into the jet impact chamber to a preset height, and connected with the tube-side outlet of the heat regenerator by the three branch pipelines.

2. The experimental system for studying jet impact characteristics at an outlet of a fast reactor core according to claim 1, wherein the cylindrical barrel of the jet impact chamber is coated with a heat preservation layer, a diameter of the cylindrical barrel is 580 mm, and a height of the cylindrical barrel is 800 mm; and a diameter of the solid cylinder which is installed in the center of the top section of the cylindrical barrel is 180 mm, and the solid cylinder is made of stainless steel.

3. The experimental system for studying jet impact characteristics at an outlet of a fast reactor core according to claim 1, wherein the thermocouple arrangement frame has six layers in a height direction of the cylindrical barrel, three layers of the six layers are located in an area corresponding to the solid cylinder, six of the high-temperature-resistant thermocouples are uniformly arranged on each of the three layers in a circumferential direction of the cylindrical barrel, remaining three layers of the six layers are located in an area between the three jet impact nozzles and the solid cylinder, and thirteen of the high-temperature-resistant thermocouples are uniformly arranged on each of the remaining three layers in the circumferential direction and a radial direction of the cylindrical barrel.

4. The experimental system for studying jet impact characteristics at an outlet of a fast reactor core according to claim 1, wherein the high-temperature strain gauges that are arranged on the portions of the wall surface of the solid cylinder are arranged into two layers in a height direction of the cylindrical barrel, and four of the high-temperature strain gauges are uniformly arranged on each of the two layers in a circumferential direction of the cylindrical barrel.

5. The experimental system for studying jet impact characteristics at an outlet of a fast reactor core according to claim 1, wherein the three jet impact nozzles are hexagonal sleeves, thicknesses of the hexagonal sleeves are 4 mm, a side length inside each of the hexagonal sleeves is 54 mm, the three jet impact nozzles are arranged triangularly, and a distance between centers of any two adjacent nozzles of the three jet impact nozzles is 62 mm.

6. The experimental system for studying jet impact characteristics at an outlet of a fast reactor core according to claim 1, wherein an annular flow channel is formed in the top section of the cylindrical barrel, the fluid flows out through the annular flow channel and is connected to the shell-side inlet of the heat regenerator through the first pipeline.

* * * * *